United States Patent
Johnson

(10) Patent No.: US 6,221,306 B1
(45) Date of Patent: Apr. 24, 2001

(54) PIN-IN-SLEEVE DEVICE FOR IN-ARTICLE GAS ASSISTED INJECTION MOLDING

(75) Inventor: Steven L. Johnson, East Claridon, OH (US)

(73) Assignee: Nitrojection Corporation, Middlefield, OH (US)

(*) Notice: Subject to any disclaimer, the term of this patent is extended or adjusted under 35 U.S.C. 154(b) by 0 days.

(21) Appl. No.: 09/272,142

(22) Filed: Mar. 19, 1999

Related U.S. Application Data

(60) Provisional application No. 60/078,738, filed on Mar. 20, 1998.

(51) Int. Cl.[7] ................................................. B29C 45/17
(52) U.S. Cl. .......................... 264/572; 55/385.1; 425/130; 425/546
(58) Field of Search ...................... 264/572; 425/130, 425/546; 95/273; 55/385.1

(56) References Cited

U.S. PATENT DOCUMENTS

| | | | |
|---|---|---|---|
| Re. 35,705 | 12/1997 | Moldovanyi | 425/130 |
| 4,859,397 | * 8/1989 | Peters | 425/536 |
| 4,905,901 | 3/1990 | Johnson | 264/328.7 |
| 5,080,570 | * 1/1992 | Baxi et al. | 425/130 |
| 5,096,655 | * 3/1992 | Baxi et al. | 264/572 |
| 5,164,200 | 11/1992 | Johnson | 425/130 |
| 5,208,046 | 5/1993 | Shah et al. | 425/130 |
| 5,232,654 | 8/1993 | Aida et al. | 264/572 |
| 5,464,342 | 11/1995 | Marik et al. | 264/572 |
| 5,466,141 | * 11/1995 | Eckardt et al. | 425/130 |

FOREIGN PATENT DOCUMENTS

| | | |
|---|---|---|
| 0 421 842 | 4/1991 | (EP). |
| 0 485 726 | 5/1992 | (EP). |
| 0 763 414 | 3/1997 | (EP). |
| 6-254865 | * 9/1994 | (JP). |
| 10-100203 | * 4/1998 | (JP). |

OTHER PUBLICATIONS

Patent Abstracts of Japan, vol. 98, No. 9, Jul. 31, 1998.
Patent Abstracts of Japan, vol. 18, No. 650 (M–1719), Dec. 9, 1994.

* cited by examiner

*Primary Examiner*—Robert Davis
(74) *Attorney, Agent, or Firm*—Fay, Sharpe, Fagan, Minnich & McKee, LLP

(57) ABSTRACT

A readily replaceable pin-in-sleeve device (A, B) for gas-assisted injection molding is used with a two-part mold to form an injection molded product from a plastic material. A sleeve (10) has a threaded exterior surface that is shaped to be received in a socket (130) of a mold member (210) opening into a mold cavity. A longitudinally extending bore (20) extends through the sleeve. The bore has a first portion (22) adjacent the cavity, and a second, larger diameter portion (24), spaced from the cavity. A pin (40) extends through the sleeve and has a forward section and an enlarged base, which are received in the bore first and second portions, respectively. A tortuous path for an injection fluid is defined between the pin and the bore to inhibit transport of plastic material into the device when the injection fluid is vented from the mold cavity. A filter 60 positioned in the bore, behind the pin, filters traces of plastic material from the vented injection fluid. A simple tool, such as a socket wrench, quickly unscrews the device from the mold member.

21 Claims, 4 Drawing Sheets

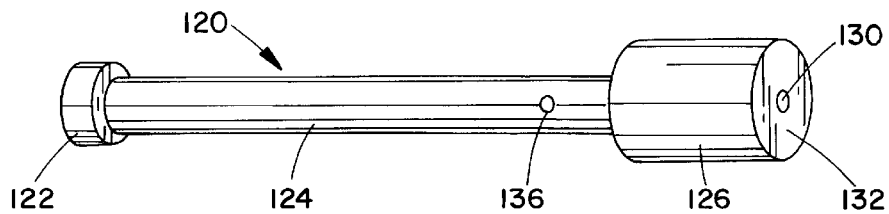
FIG. 6
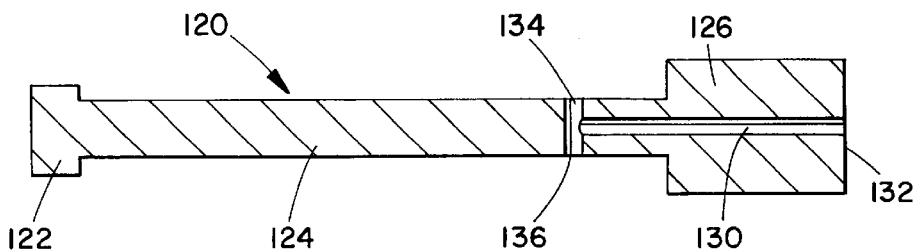
FIG. 7
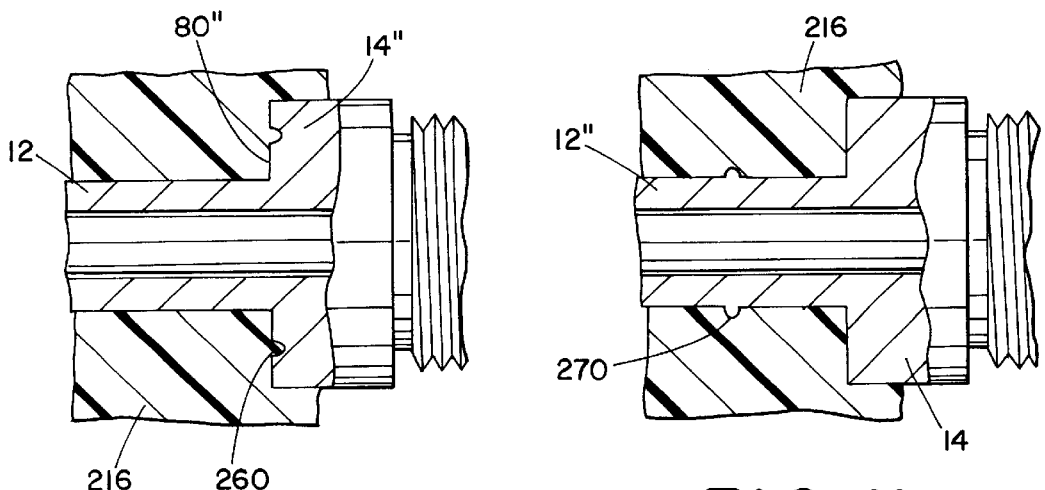
FIG. 10
FIG. 11

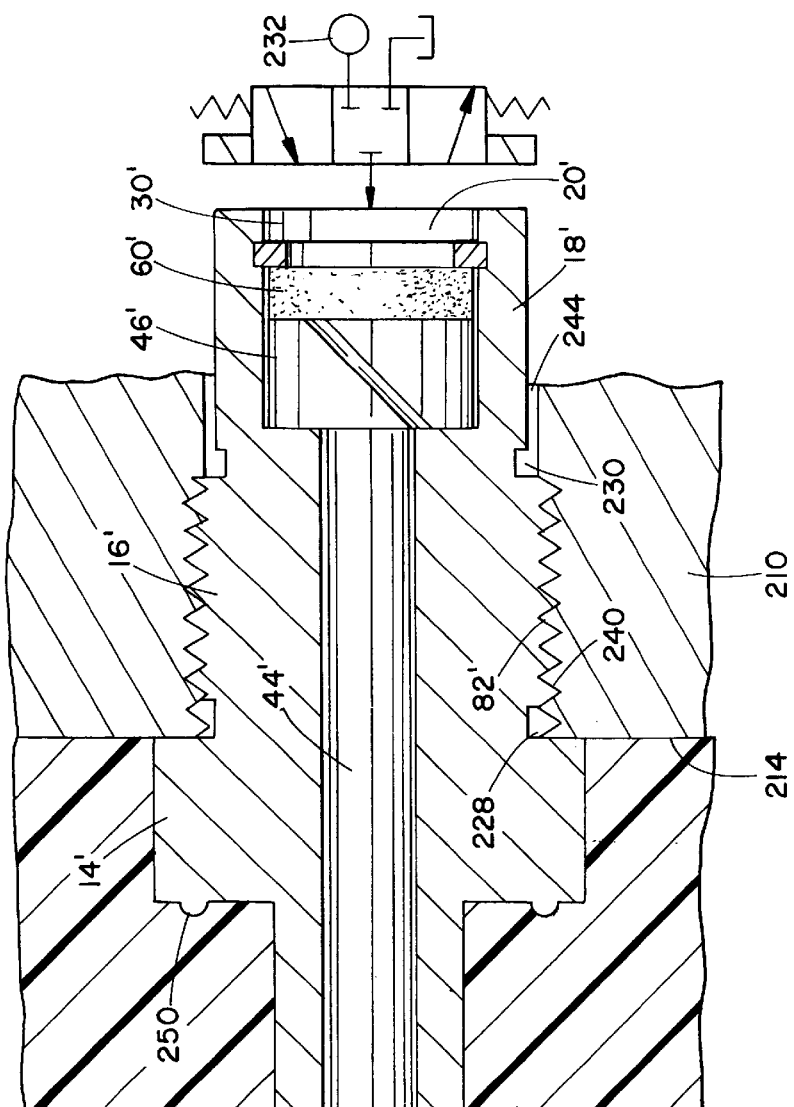
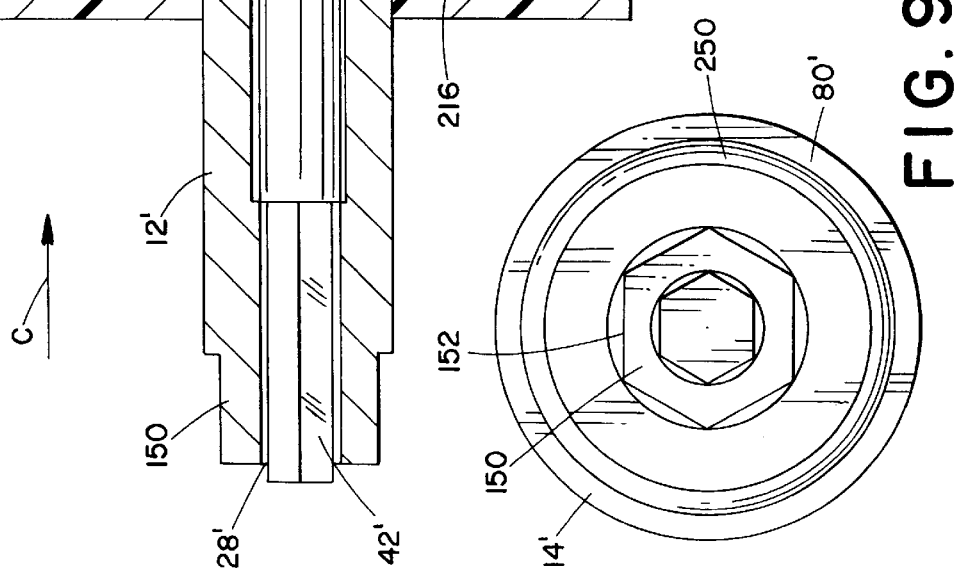

PIN-IN-SLEEVE DEVICE FOR IN-ARTICLE GAS ASSISTED INJECTION MOLDING

This application claims the priority of U.S. Provisional application Ser. No. 60/078,738, filed Mar. 20, 1998.

BACKGROUND OF THE INVENTION

This invention generally pertains to an injection molding apparatus. More specifically, the present invention relates to a gas assisted injection molding apparatus which utilizes a pin-in-sleeve device to direct a gas into a mold cavity.

Gas assisted injection molding has by now become quite popular for its many advantages. These advantages are set forth in, e.g., U.S. Pat. Nos. 4,905,901 dated Mar. 6, 1990; 5,151,278 dated Sep. 29, 1992; 5,164,200 dated Nov. 17, 1992; 5,174,932 dated Dec. 29, 1992 and 5,256,047 dated Oct. 26, 1993. The disclosure of each of these patents is specifically incorporated hereinto in its entirety.

For a pin-in-sleeve arrangement, a pin is positioned in a sleeve such that an annular fluid flow passage is defined between the pin and the sleeve. Pin-in-sleeve arrangements are employed for feeding gas into a mold cavity either through a nozzle, which regulates the flow of plastic into the mold cavity, or spaced from such nozzle. When the pin-in-sleeve device is spaced from the nozzle, the gas is directed into the article. This is termed in-article gas assisted injection molding.

When an in-article gas assisted injection molding device is employed, it is desirable to allow a quick change out of a gas pin of the device. The quick change out feature reduces down time for a molder who would normally have to pull the mold out of the injection molding machine to replace a pin that has become plugged with resin.

Resin plugging of gas injection pins has always been the main problem of gas assisted injection molding. There have been many complicated devices invented to overcome this problem. However, none of these devices have really worked satisfactorily. The pin-in-sleeve design for in-article gas assisted injection molding disclosed herein recognizes the fact that pins without check valves always will plug sooner or later.

Accordingly, it has been considered desirable to develop a new and improved pin-in-sleeve device for in-article gas assisted injection molding which would overcome the foregoing difficulties and others while providing better and more advantageous overall results.

SUMMARY OF THE INVENTION

In accordance with one aspect of the present invention, a pin-in-sleeve device for injecting a non-viscous fluid into a cavity of a mold is provided. The mold includes a socket for receiving the device. The socket has an open end which opens into the mold cavity. The device includes a sleeve, which is received in the socket, and a pin, which extends through the sleeve. The sleeve includes a longitudinally extending bore with an open first end. The bore has a first portion of a first diameter adjacent the bore open end, and a second portion of a second, larger diameter A fluid flow path for the non-viscous fluid is defined between the pin and the bore.

The pin includes a forward section, which is received in the bore first portion, and a base, which is received in the bore second portion. The base has a diameter which is larger than the diameter of the bore first portion. A restraining member is connected with the sleeve for restraining the pin in the sleeve.

In accordance with another aspect of the present invention, an apparatus for use in fluid assisted injection molding of plastic material so as to form an injection molded product is provided. The apparatus includes a pair of mold members defining, when connected, a sealed cavity. A first opening is provided in one of the mold members for admitting the plastic material into the cavity. A second opening is provided in one of the mold members and spaced from the first opening for admitting a fluid into the cavity.

A sleeve extends through the second opening. The sleeve has a longitudinally extending bore opening into the cavity. The bore has a first portion of a first diameter adjacent the cavity, and a second portion of a second, larger diameter spaced from the cavity.

A pin extends through the sleeve. A fluid flow path is defined between the pin and the bore. The pin includes a forward section, which is received in the bore first portion, and a base, which is received in the bore second portion. The base has a diameter which is larger than the diameter of the bore first portion.

In accordance with yet another aspect of the present invention, a method of fluid assisted injection molding of plastic material is provided for forming an injection molded product. The method includes threadably connecting a pin-in-sleeve device, substantially as previously described, to a socket in one of a pair of mold members. The method further includes connecting the mold members together to form a sealed cavity which is defined by the mold members, such that the bore open end communicates with the cavity and injecting the plastic material through a nozzle into the sealed cavity. Further, the method includes injecting a fluid through a fluid flow path defined between the pin and the bore.

One advantage of the present invention is the provision of a pin-in-sleeve device in which the pin is easy to change, the device is easy to disassemble and clean, and the device provides a means whereby resin cannot get beyond the pin assembly and into the gas feeding lines.

Another advantage of this invention is the provision of a self-contained pin-in-sleeve design for in article gas assisted injection molding.

Yet another advantage of the present invention is the provision of a pin-in-sleeve gas injection and withdrawal device for in article gas assisted injection molding which employs a sintered metal filter to prevent any resin from getting behind the pin assembly.

Still another advantage of the present invention is provision of a pin-in sleeve device in which a tip of the pin has a hexagonal cross section with a largest diameter which is substantially equal to the diameter of an adjacent first portion the bore such that the flow path is divided into sectors.

A further advantage of the present invention is provision of a pin-in-sleeve gas injection device having a threaded portion on an exterior surface of the sleeve of the device for threading the device into the mold socket.

A yet further advantage of the present invention is the provision of a pin-in-sleeve device in which an exterior of the sleeve is shaped for engagement by a suitable tool for inserting and removing the device from a socket.

A still yet further advantage of the present invention is the provision of a pin-in-sleeve device with an annular rib or groove for keying into adjacent viscous fluid in the cavity to inhibit the flow of non-viscous fluid around the device and into a socket in which the device is mounted.

Still further advantages of the present invention will become apparent to those of ordinary skill in the art upon a reading and understanding of the following detailed description of the preferred embodiments.

BRIEF DESCRIPTION OF THE DRAWINGS

The invention may take form in certain parts and arrangements of parts, preferred embodiments of which will be described in detail in this specification and illustrated in the accompanying drawings which form a part hereof and wherein:

FIG. 6 is a perspective view of an alternate embodiment of a pin for use in the sleeve of FIG. 5;

FIG. 7 is a cross-sectional view of the pin of FIG. 6;

FIG. 8 is a schematic side elevational view of a pin-in-sleeve device according to a second preferred embodiment of the present invention, as inserted into a mold body;

FIG. 9 is a top plan view of the device of FIG. 8 disassembled from the mold body;

FIG. 10 is a schematic side elevational view of a portion of a pin-in-sleeve device for gas assisted injection molding according to a third preferred embodiment of the present invention; and, FIG. 11 is a cross-sectional view of a pin-in-sleeve device for gas assisted injection molding according to a fourth preferred embodiment of the present invention.

DETAILED DESCRIPTION OF THE PREFERRED EMBODIMENTS

Figure 1:
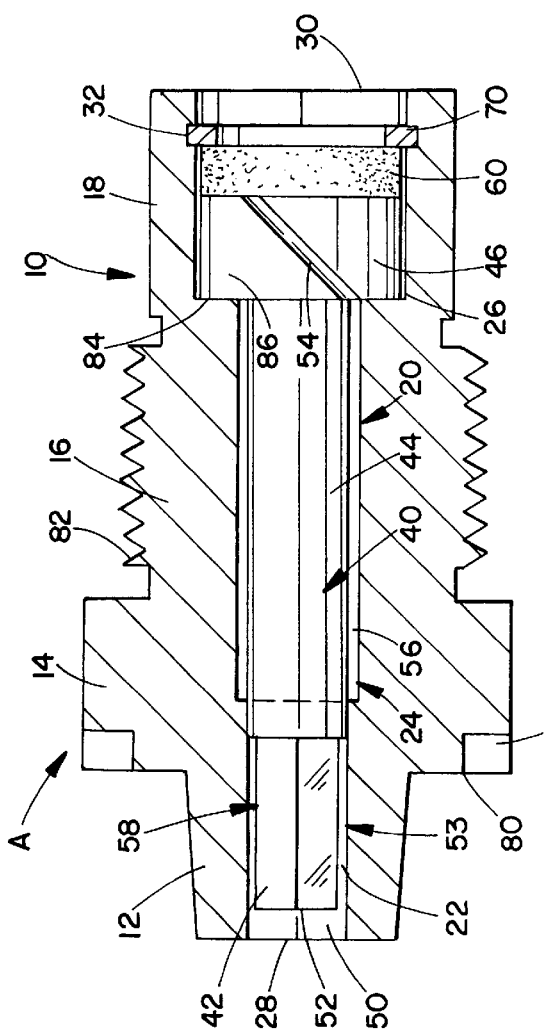
FIG. 1 is a schematic side elevational view in cross-section of a pin-in-sleeve device for in-article gas assisted injection molding, according to a first preferred embodiment of the present invention.

Referring now to the drawings which are for the purpose of illustrating preferred embodiments of the invention only and not for the purpose of limiting same, FIG. 1 shows a first preferred embodiment of the subject new pin-in-sleeve device A for gas assisted injection molding. As will be appreciated from the several patents which are incorporated hereinto by reference, the pin-in-sleeve design is employed for use in gas assisted injection molding apparatus which includes a conventional mold body and a conventional plastic injection nozzle associated with the mold body and spaced from the pin-in-sleeve device.

The pin-in-sleeve device A includes a sleeve 10 having a reduced diameter forward section 12, an enlarged diameter collar section 14, a central section 16 which is of a smaller outer diameter than the collar section 14 and a rear section 18. The rear section is of a somewhat smaller diameter than is the central section. Extending longitudinally through the sleeve 10 is a bore 20. The bore has a first portion 22 of a first diameter, a second portion 24 of a second and somewhat larger diameter than the first portion, and a third portion 26 which is of an enlarged diameter in relation to the second portion 24. The bore has a first open end 28, opening into the first portion 22, in the forward section of the sleeve and a second open end 30, opening into the third portion 26, in the rear section of the sleeve. A groove 32 extends peripherally around the wall of the bore third portion 26.

Figure 2:
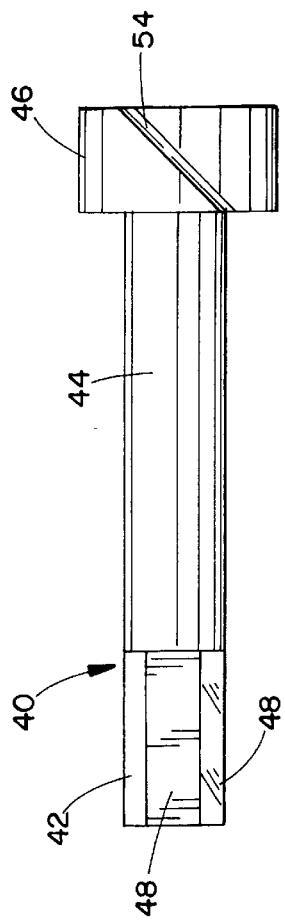
FIG. 2 is a side elevational view of the pin used in the device of FIG. 1.
Figure 3:
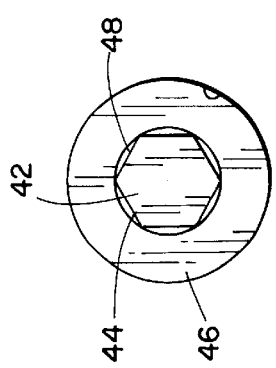
FIG. 3 is a front elevational view of the pin used in the device of FIG. 1.

With reference now to FIG. 2, a pin 40 is selectively positioned in the sleeve bore 20. The pin comprises a tip 42, a shaft 44 and an enlarged diameter base 46. The tip 42 of the pin is provided with a plurality of sides 48 whereas the shaft 44 is shaped substantially as a right cylinder. As illustrated in FIG. 3, preferably six such sides 48 are machined into the tip so as to form a hexagonal appearance for the tip. It is apparent from FIG. 3 that the largest diameter of the tip is identical to the diameter of the shaft 44. However, the smallest diameter as defined by the flats of the hexagonal sides is smaller than the diameter of the shaft 44. As illustrated in FIG. 1, the tip 42 is seated in the bore first portion 22 whereas the shaft 44 is seated in the bore second portion 24. The enlarged base 46 is seated in the bore third portion 26.

It should also be apparent from FIG. 1 that the pin 40 is recessed in the bore 20 such that a front portion 50 of the bore is located before a front wall 52 of the pin 40. Recessing the pin somewhat in the bore of the sleeve is advantageous from the standpoint that there is less of a tendency for molten thermoplastic to plug a gas flow path 53 defined between the pin and the sleeve. The gas flow path 53 has three sections 54, 56, and 58. The first of these sections is defined by a narrow slot 54 machined in the pin base 46. Alternatively, the slot may be formed in the bore wall. It is apparent from FIG. 2 that the slot extends at an angle to the longitudinal axis of the pin. The second section of the gas flow path is defined by an annular opening 56 located between the pin shaft 44 and the inner wall of the bore second portion 24. The third and final section 58 of the flow path is defined by the six sectors formed between the hexagonal sides 48 of the pin tip and the wall of the bore first portion 22. These flow path sections 54, 56 and 58 provide for substantially unrestricted flow of gas toward the front portion 50 of the bore, but, due to their small size, prevent substantial rearward flow of the viscous molten thermoplastic back down the gas flow path.

Optionally, the flow path second section 56 may be further constricted to provide a more tortuous path. For example, the surface of the bore second portion 24 may be threaded or otherwise configured for providing a tortuous path which is readily traversed by a relatively non-viscous gas, but less easily traveled by a relatively viscous molten plastic material.

Positioned in the bore third portion 26 is a filter 60. Preferably, the filter is made of a sintered material, such as a conventional sintered metal. The purpose for the sintered material filter 60 is to prevent the flow of any molten thermoplastic rearwardly in the gas flow path beyond the bore third portion 26. As shown best in FIG. 4, holding the filter 60 in place in the bore third portion 26 is a removable clip, such as a conventional snap ring 70. The snap ring fits into the groove 32 defined in the bore third portion 26, and can be removed, if desired for removing the filter 60 and hence the pin 20, from the sleeve.

Figure 5:
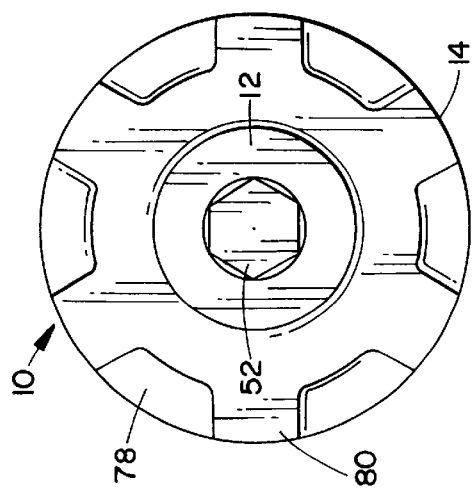
FIG. 5 is a top plan view of the device of FIG. 1.
Figure 4:
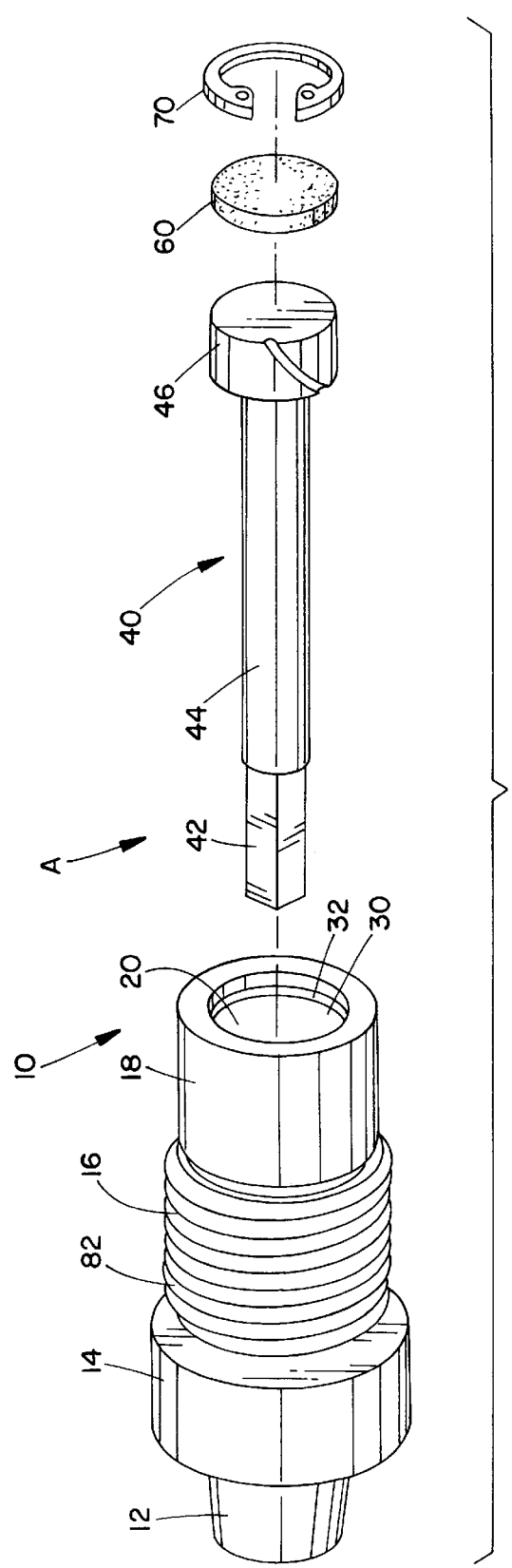
FIG. 4 is an exploded perspective view of the device of FIG. 1.

With reference now to FIG. 5, a front view of the sleeve 10 illustrates that there are provided a plurality of spaced spanner wrench depressions 78 located on a forward surface 80 of the collar 14 of the sleeve. These enable the sleeve 10 to be rotated in relation to a mold section of a conventional mold assembly when the device is inserted into, or removed from the mold. Defined around the central section 16 of the sleeve is a threading 82, as shown in FIG. 4. The threading enables the sleeve to be selectively threaded into or removed from a mold portion.

It will thus be appreciated that the pin 40 is held in position in a mold by the sleeve, filter and the clip and that it is not necessary to connect the pin separately to the mold, such as by a threading on the pin, as in many conventional pin-in sleeve-devices. This lack of connection of the pin with the surrounding mold facilitates insertion of the pin into the mold and removal therefrom, which will be described in detail later. The pin 40 is prevented from being drawn out of the sleeve and into the mold by the large diameter base 46, which is wider than the bore second portion 24. As shown in FIG. 1, a shelf 84 is defined between the bore second and third portions 24 and 26 which engages an upper, or forward surface 86 of the pin base 46. The clip and the shelf maintain the position of the pin relative to the sleeve such that the front wall 52 of the pin tip 42 is correctly positioned in relation to the forward section 12 of the sleeve.

With reference once more to FIG. 4, the pin-in-sleeve device A is readily assembled form its component parts. First, the tip 42 of the pin 40 is inserted through the opening 30 defined in the rear section 18 of the sleeve 10 and slid up the bore 20. With the base 46 of the pin seated in contact with the shelf 84, the filter 60 is inserted through the opening 30 into the bore third portion 26, and is seated behind the pin base 46. Finally, the clip 70 is compressed so that it can fit through the opening 30 and is seated in the groove 32 behind the filter 60. The pin 40 and filter 60 are now tightly held in the sleeve. It will be appreciated that other embodiments of the pin-in-sleeve device shown herein are assembled in the same manner. The device A can be disassembled for cleaning by reversing the process. A tool, such as a pair of needle nose pliers, is effective for removing the clip 70 from the groove 32.

With reference now to FIGS. 6 and 7, an alternative embodiment of a pin 120 is there shown. The pin 120 includes an enlarged tip 122, a reduced diameter shaft 124 and an enlarged diameter base 126. It can be seen that an aperture 130 extends longitudinally in the pin 120 from a rear end 132 of its base 126 and up into the shaft 124 thereof. A cross bore 134 communicates with a distal end of the aperture 130 and leads to a pair of opposed ports 136. This design allows a suitable fluid, such as a gas, to flow from the rear end 132 of the enlarged diameter base 126 through the aperture 130 and then out through the ports 136 of the cross bore 134. Thereafter, the gas flows in an annular flow space defined between the outer surface of the pin and the inner wall of the sleeve in the bore 20 surrounding the pin. The enlarged tip 122 is closely spaced from the first portion of the bore 22 to define a narrow annular portion of the flow path.

With reference now to FIGS. 8 and 9, another embodiment of a pin-in-sleeve device B is there illustrated as it would be positioned in a mold. The pin-in-sleeve device of FIG. 8 is substantially similar to the device A of FIGS. 1–4. For ease of illustration, therefore, the same numbers will be used for similar parts, identified with a primed suffix ('). New components are identified by new numerals. As for the sleeve 10 of FIG. 1, the sleeve 10' includes a reduced diameter forward section 12', an enlarged collar section 14', a central section 16', and a rear section 18'. However, the forward section 12' of the sleeve 10' is significantly longer than is the forward section 12 of the sleeve 10. Additionally, the tip 42' of the pin 40' protrudes beyond the forward section 12' of the sleeve. A forward end portion 150 of the sleeve forward section 12' has outer periphery 152 which is shaped for engagement by a wrench or other suitable tool with a correspondingly-shaped socket. As shown in FIG. 9, the outer periphery 152 is hexagonally shaped, although other suitable shapes are also contemplated.

The mold into which the device B or A is fitted generally comprises two mold halves 210, only one of which is shown. Together, the mold halves 210 define an internal cavity having a peripheral wall 214. The two mold halves are releasably connected such that they can be separated for removing a molded item. The cavity is of suitable dimensions to mold a viscous fluid, such as a plastic material 216, which is injected into the cavity through a nozzle (not shown).

The wall 214 of the cavity defined by one of the mold halves 210 includes an opening 228, spaced from the nozzle, which provides access to a socket 230 formed in the mold half. The socket is shaped to receive the central section 16' and the rear section 18' of the sleeve. A source 232 of pressurized non-viscous fluid, such as a gas, is connected with the bore second opening 30'. The gas assists in forming the shape of the plastic material by forcing it against the cavity walls. The gas is vented from the mold cavity after the plastic material has set in the desired shape as is known.

The pin-in-sleeve device B is positioned in the socket 230 with the sleeve forward section 12' and collar section 14' protruding beyond the cavity wall 214 and into the mold cavity. To insert the device B of FIG. 9 into the mold half 210, the device B is positioned over the opening 228 defined in the cavity wall 214 of the mold half while the two mold halves are disconnected. The socket has an outer, threaded section 240, closest to the opening which accommodates and engages the central threaded section 18' of the sleeve. The diameter of the collar section 14' of the sleeve is larger than that of the opening 228 to the outer section so that the collar section rests on the adjacent cavity wall 214 when the device B is inserted. An inner section 244 of the socket is shaped to receive the rear section 18' of the sleeve therein, and thus may be of a smaller diameter than the socket outer section.

The device B is slid into the opening 228, base 18' first, in the direction of arrow C, from the cavity side of the mold half 210. The threading 82' of the central section is engaged with the threads of the socket outer section 240. A suitable socket wrench is preferably positioned over the hexagonal periphery 152 of the forward end portion 150 of the sleeve forward section and rotated in a plane perpendicular to the axis of the pin to rotate the sleeve and engage the threading 82' with the socket outer section 240.

The device A of FIG. 1 is similarly inserted into a mold half, but in the case of device A, a spanner wrench is engaged with the spanner wrench depressions 78 and rotated to engage the threads. Obviously, the pin-in-sleeve device could include both spanner wrench depressions and a hexagonal end portion for providing compatibility with different tools. If the forward section is particularly long, however, it may be more convenient to use a hexagonal end portion rather than spanner wrench depressions because of the difficulty of fitting a spanner wrench over the forward section.

In use, the plastic material 216 is injected into the mold from the nozzle. Pressurized non-viscous fluid, such as gas, enters the third portion 26, 26' of the sleeve bore 20, 20' of embodiments A or B from the second opening 30' in the bore and passes through the filter 60, 60' before traveling up the gas flow path, defined between the pin and the sleeve.

During venting of the gas, the shape of the pin and sleeve inhibits plastic material from being drawn into the device along with the gas. The gas is vented through the fluid flow path defined between the pin and the sleeve and through the filter 60, 60'. The filter prevents any small amounts of plastic material which have been drawn into the device from being sucked into the gas lines.

Preferably, the pin-in-sleeve device includes a keying member which keys the adjacent setting plastic 216 to the device. In the embodiment of FIG. 8 the keying member takes the form of an upwardly projecting annular rib 250 defined on the forward surface 80' of the collar section 14'. The plastic material 216 flows over the collar section as it is injected into the mold and keys on to the annular rib 250 as it begins to set, anchoring the plastic to the collar section. This helps to prevent the gas from flowing along the outer periphery of the sleeve forward section 12', over the collar section 14' and into the outer section 240 of the socket 230, and past the threads.

The device is readily removed from the mold half 210, when desired. With the two mold halves disconnected, a wrench is placed over the hexagonal forward end portion 150 of the sleeve forward section 12' of the device B, or over the spanner wrench depressions 78 of the device A, and rotated until the threading 82, 82' on the sleeve central section is disengaged from the corresponding thread on the socket 230. Since the pin 40, 40' is not separately connected to the mold half 210, the pin-in-sleeve device can then be removed from the mold half without the need for separately disconnecting the pin from the mold.

With reference to FIG. 10 an alternative embodiment of a sleeve includes a keying member in the form of an annular groove 260 on a forward surface 80" of a sleeve collar section 14", in place of the projecting rib 250 of FIGS. 8 and 9. In another embodiment, shown in FIG. 11, a sleeve includes a laterally projecting annular rib 270, which extends from an exterior side of a sleeve forward section 12". Like, the rib 250 of FIG. 9, the groove 260 of FIG. 10 and the rib of FIG. 11 act as an anchor for the setting plastic material, reducing the likelihood of gas working its way into the mold opening when pressurized gas is injected into the mold cavity.

The invention has been described with reference to several preferred embodiments. Obviously, modifications and alterations will occur to others upon a reading and understanding of the preceding specification. It is intended that the invention be construed as including all such modifications and alterations insofar as they come within the scope of the appended claims or the equivalents thereof.

Having thus described the preferred embodiment, the invention is now claimed to be:

1. A pin-in-sleeve device for injecting a non-viscous fluid into a cavity of a mold, the mold including a socket for receiving the device, the socket having an open end which opens into the mold cavity, the device comprising:

a sleeve which is received in the socket, the sleeve including:

a longitudinally extending bore with an open first end, the bore having a first portion of a first diameter adjacent the bore open end, and a second portion of a second diameter, the second diameter being larger than the first diameter; a pin extending through the sleeve, a fluid flow path for the non-viscous fluid defined between the pin and the bore, the pin including:

a forward section which is received in the bore first portion, and a base which is received in the bore second portion, the base having a diameter which is larger than the diameter of the bore first portion, an exterior surface of the sleeve including at least one of an annular rib and an annular groove for keying into adjacent viscous fluid in the cavity, the annular rib or groove being spaced from the open end of the socket, within the mold cavity; and, a restraining member, connected with the sleeve for restraining the pin in the sleeve.

2. A pin-in-sleeve device for injecting a non-viscous fluid into a cavity of a mold, the mold including a socket for receiving the device, the socket having an open end which opens into the mold cavity, the device comprising:

a sleeve which is received in the socket, the sleeve including:

a longitudinally extending bore with an open first end, the bore having a first portion of a first diameter adjacent the bore open end, and a second portion of a second diameter, the second diameter being larger than the first diameter;

a pin extending through the sleeve, a fluid flow path for the non-viscous fluid defined between the pin and the bore, the pin including:

a forward section which is received in the bore first portion, and a base which is received in the bore second portion, the base having a diameter which is larger than the diameter of the bore first portion;

a restraining member, connected with the sleeve for restraining the pin in the sleeve; and a filter which is received in the bore second portion rearward of the pin.

3. The pin-in-sleeve device of claim 2, wherein the filter is positioned between the restraining device and the base of the pin.

4. The pin-in-sleeve device of claim 1, wherein the pin forward section comprises:

a tip which is shaped such that a portion of the fluid flow path between the bore and the tip is divided into a plurality of sectors; and, a shaft which is positioned between the tip and the base.

5. The pin-in-sleeve device of claim 4, wherein the tip has a hexagonal cross section with a largest diameter which is substantially equal to the diameter of the bore first portion.

6. The pin-in-sleeve device of claim 5, wherein the shaft is generally cylindrical and has a diameter equal to the largest diameter of the tip.

7. The pin-in-sleeve device of claim 4, wherein the bore further comprises a third portion, between the first and second portions, which has a diameter larger than that of the bore first portion and smaller than that of the bore second portion, the shaft being received in the bore third portion and the tip being received in the bore first portion.

8. The pin-in-sleeve device of claim 1, wherein an exterior surf ace of the sleeve includes a threaded portion for engaging a corresponding threaded portion on the mold socket.

9. The pin-in-sleeve device of claim 8, wherein the exterior surface of the sleeve defines a collar section and a central section, the collar section having a diameter which is larger than the socket open end, the threaded portion being defined on the central section.

10. The pin-in-sleeve device of claim 9, wherein the collar section includes a plurality of spaced depressions for receiving a suitable tool which rotates the device for engaging the threads on the central section of the sleeve with the corresponding threaded portion on the mold socket.

11. The pin-in-sleeve device of claim 9, wherein the sleeve further includes a forward section, forward of the collar section, and wherein the forward section has a plurality of faces for engagement by a suitably shaped socket tool which rotates the device for engaging the threads on the central section of the sleeve with the corresponding threaded portion on the mold socket.

12. The pin-in-sleeve device of claim 1, wherein a slot is defined in an outer surface of the pin base, a portion of the fluid flow path being formed between the slot and the second portion of the bore.

13. The pin-in-sleeve device of claim 4, wherein an aperture extends longitudinally in the pin from a rear end of the base into the shaft and communicates with the bore first portion to form a portion of the fluid flow path.

14. An apparatus for use in fluid assisted injection molding of plastic material so as to form an injection molded product, the apparatus comprising:
   a pair of mold members defining, when connected, a sealed cavity,
   a first opening provided in one of the mold members for admitting the plastic material into the cavity;
   a second opening provided in one of the mold members and spaced from the first opening for admitting a fluid into the cavity;
   a sleeve extending through the second opening, the sleeve having a longitudinally extending bore opening into the cavity, the bore having a first portion of a first diameter adjacent the cavity, and a second portion of a second diameter spaced from the cavity, the second diameter being larger than the first diameter, wherein the sleeve includes a portion spaced radially inwardly from a wall of the mold cavity, said portion including a means for keying into adjacent viscous fluid in the cavity; and,
   a pin extending through the sleeve, a fluid flow path defined between the pin and the bore, the pin including:
      a forward section which is received in the bore first portion, and
      a base which is received in the bore second portion, the base having a diameter which is larger than the diameter of the bore first portion.

15. The apparatus of claim 14, further comprising a restraining member, connected with the sleeve for restraining the pin in the sleeve.

16. An apparatus for use in fluid assisted injection molding of plastic material so as to form an injection molded product, the apparatus comprising:
   a pair of mold members defining, when connected, a sealed cavity,
   a first opening provided in one of the mold members for admitting the plastic material into the cavity;
   a second opening provided in one of the mold members and spaced from the first opening for admitting a fluid into the cavity;
   a sleeve extending through the second opening, the sleeve having a longitudinally extending bore opening into the cavity, the bore having a first portion of a first diameter adjacent the cavity, and a second portion of a second diameter spaced from the cavity, the second diameter being larger than the first diameter;
   a pin extending through the sleeve, a fluid flow path defined between the pin and the bore, the pin including:
      a forward section which is received in the bore first portion, and
      a base which is received in the bore second portion, the base having a diameter which is larger than the diameter of the bore first portion; and a filter which is received in the bore second portion.

17. The pin-in-sleeve device of claim 14, wherein an exterior surface of the sleeve includes a threaded portion for engaging a corresponding threaded portion on the mold socket.

18. A method of fluid assisted injection molding of plastic material so as to form an injection molded product, the method comprising:
   threadably connecting a pin-in-sleeve device to a socket in one of a pair of mold members, the pin-in-sleeve device including:
      a sleeve having a longitudinally extending bore with an open end, the bore having a first portion of a first diameter adjacent the bore open end, and a second portion of a second diameter spaced from the open end, the second diameter being larger than the first diameter;
      a pin extending through the sleeve, the pin including:
         a forward section which is received in the bore first portion, and
         a base which is received in the bore second portion, the base having a diameter which is larger than the diameter of the bore first portion;
   connecting the mold members together to form a sealed cavity which is defined by the mold members, such that the bore open end communicates with the cavity;
   injecting the plastic material through a nozzle into the sealed cavity;
   keying the sleeve to the plastic material at a location spaced radially inwardly from a wall of the sealed cavity; and,
   injecting a fluid through a fluid flow path defined between the pin and the bore.

19. A method of fluid assisted injection molding of plastic material so as to form an injection molded product, the method comprising:
   threadably connecting a pin-in-sleeve device to a socket in one of a pair of mold members, the pin-in-sleeve device including:
      a sleeve having a longitudinally extending bore with an open end, the bore having a first portion of a first diameter adjacent the bore open end, and a second portion of a second diameter spaced from the open end, the second diameter being larger than the first diameter;
      a pin extending through the sleeve, the pin including:
         a forward section which is received in the bore first portion, and
         a base which is received in the bore second portion, the base having a diameter which is larger than the diameter of the bore first portion;
   connecting the mold members together to form a sealed cavity which is defined by the mold members, such that the bore open end communicates with the cavity;
   injecting the plastic material through a nozzle into the sealed cavity;
   injecting a fluid through a fluid flow path defined between the pin and the bore;
   venting the injected fluid from the cavity through the fluid flow path; and,
   filtering the vented fluid of traces of plastic material with a filter located in the bore second portion.

20. The pin-in-sleeve device of claim 1, wherein an annular groove is defined on the exterior surface of the sleeve.

21. The pin-in-sleeve device of claim 1, wherein a laterally projecting annular rib is defined on the exterior surface of the sleeve.

* * * * *